March 29, 1960  D. E. WILLIS  2,930,462
PRE-BALK SYNCHRONIZER
Filed Oct. 29, 1956
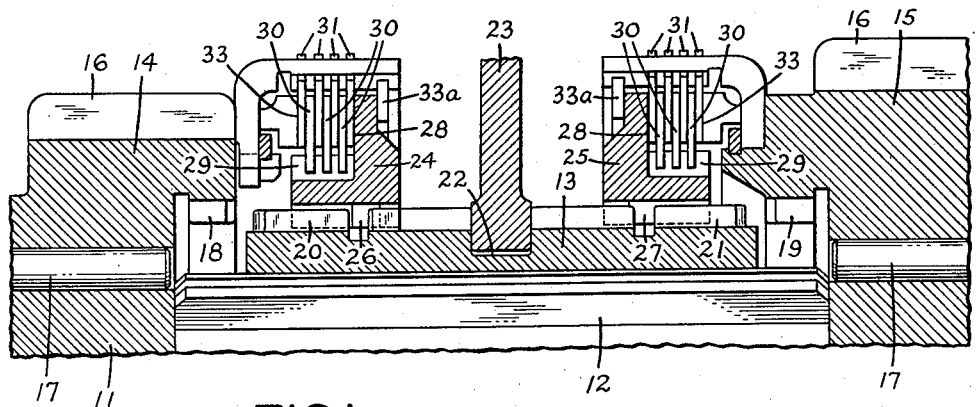
FIG.I.
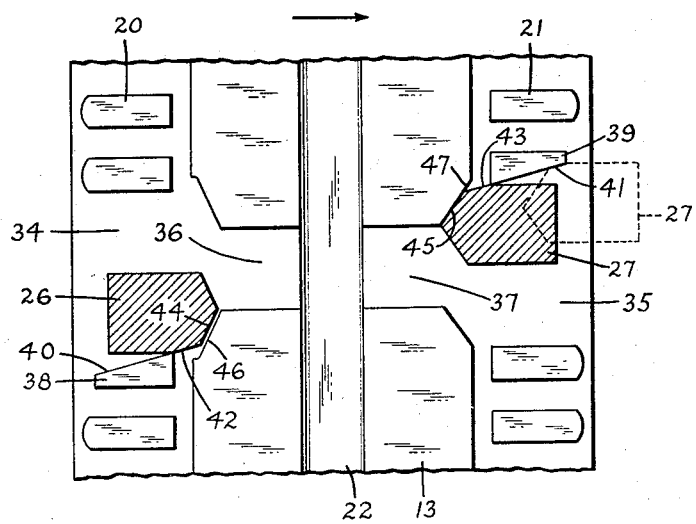
FIG.2.
INVENTOR
DELBERT E. WILLIS
BY
Campbell, Brumbaugh, Free & Graves
HIS ATTORNEYS United States Patent Office 2,930,462
Patented Mar. 29, 1960

2,930,462

PRE-BALK SYNCHRONIZER

Delbert Elwood Willis, New Brunswick, N.J., assignor to Mack Trucks, Inc., Plainfield, N.J., a corporation of New York Application October 29, 1956, Serial No. 618,916

5 Claims. (Cl. 192—53)

This invention relates to synchronizing mechanisms generally, and more particularly to a new and improved synchronizing mechanism for use in connection with multi-speed transmission devices such as, for example, motor vehicle drive transmissions.

In a so-called "synchromesh" transmission device, a balking mechanism is utilized to prevent the engagement of the positive drive elements of a slidable clutch member with those of another clutch member until the two members have been brought into synchronism, thereby avoiding crashing, or meshing of the elements at a raking angle. A typical balking mechanism of this type is found in the United States patent to Bull, No. 2,397,943, and in the operation of the mechanism, as therein described, the balking elements are normally maintained in balking positions with respect to the slidable clutch member by means of a friction drag between friction clutch elements associated with the cooperating balking elements.

In other transmission devices, the friction clutch elements are pressed into frictional contact by mechanical elements such as spring biased detent to cause the balking elements to be moved into opposition, thereby requiring synchronization of the clutch members before the balking elements can disengage to allow engagement of the positive clutch elements.

It has been found that high speed operation of recently developed power shifting devices prevents proper operation of the balking elements. These power shifting devices force the balking elements together with substantially greater impact, thereby causing the friction braking or clutch elements to slip so that the balking elements are forced past each other before synchronism is attained and crashing engagement of the positive clutch elements results. Although the possibility of crashing resulting from such slippage may be reduced by increasing the angle of engagement of the balking elements, this requires a substantially greater shifting force and results in increased wear of the components of the transmission mechanism.

It is an object of the present invention to provide a synchronizing mechanism of the above character wherein the balking elements are effectively maintained in the balking position during high speed shifting operation until the clutch elements are substantially synchronized.

Another object of the invention is to provide a new and improved synchronizing mechanism wherein the friction clutches are pressed into frictional contact upon the initiation of the shifting operation and before the balking elements are engaged and sufficiently high pressure is applied to them to prevent the balking elements from sliding past each other before the positive clutch elements are synchronized.

A further object of the invention is to provide a synchronizing mechanism which assures proper synchronization of the positive clutch elements and enables them to move readily into engagement when they are synchronized.

These and other objects of the invention are attained by providing a synchronizing mechanism in which the balking elements are normally retained in balking alignment and additional means is provided to produce a force tending to press the friction clutches into stronger frictional contact before the balking elements are engaged upon initiation of shifting motion of the slidable positive clutch. More particularly, balk actuating elements are provided on the slidable positive clutch member and one of the friction clutches so that an axial component of the shifting force presses the friction clutches into frictional contact upon the initiation of the shifting action.

Further objects of the invention will be apparent upon a reading of the following description in conjunction with the accompanying drawings, in which:

Fig. 1 is a partial view in section taken in a plane passing through the axis of the clutch mechanism and showing the balk mechanism of the present invention; and Fig. 2 is a diagrammatic illustration showing the positions of the balking elements with respect to the slidable clutch member during the shifting operation.

Referring to the figures in detail, the invention will be described as applied to a synchronizing mechanism of the type disclosed in the Bull Patent No. 2,397,943, although it will be understood that it can be applied to or used with other types of synchronizing mechanisms of structurally different kinds.

The synchronizer disclosed herein comprises a drive shaft 11 formed with splines 12 on which a clutch member 13 is slidably received. Driven members, such as the two gears 14 and 15, which are provided with gear teeth 16, are journaled on the drive shaft 11 in bearings 17 on opposite sides of the clutch member 13. Each of the gears 14 and 15 is formed with positive drive elements such as the internal clutch teeth 18 and 19 on the side adjacent the slidable clutch member. Corresponding clutch teeth 20 and 21 are provided on the periphery of the clutch member 13 at both ends so that it may be shifted into positive engagement with either of the gears 14 and 15. A centrally located peripheral groove 22 is formed in the member 13 and is adapted to receive a yoke 23 to transmit the shifting force to the slidable clutch member in the usual manner.

The slidable clutch member 13 is surrounded on opposite sides of the yoke 23 by rings 24 and 25 having balking elements or teeth 26 and 27 extending inwardly therefrom. Each of the balking members 24 and 25 is formed with a radial flange 28 and has adjacent grooves 29 in its exterior surface which are adapted to receive a series of annular clutch disks 30 in axially slidable but non-rotatable relation. Other similar disks 31, interleaved between the disks 30, are slidably but non-rotatably mounted on a spider or cage 32 mounted on each of the gears 14 and 15. The spider 32 has an internal surface for engaging the innermost disk 33 so that an axial motion of the balking member toward the gear will compress the disks between the surfaces 28 and 33, thereby urging the balking member and the corresponding gear into synchronous rotation. The disks are retained in relatively closely spaced relation by means of snap rings 33a mounted at the outer ends of the spiders 32. The structure thus far described is similar to that of synchronizers shown in Bull Patent No. 2,397,943.

The balking elements 26 and 27 extend inwardly into or are movable through gaps 34 and 35 in the series of clutch teeth 20 and 21 and are adapted to be moved axially into recesses 36 and 37 formed in the periphery of the slidable clutch member 13. Adjacent the gaps 34 and 35 and in a position to engage the balking elements 26 and 27 during the normal operation of the transmission in which the synchronizers are used are wedge-shaped balk actuating elements 38 and 39. These elements are formed on and project radially from the periphery of the clutch member and have contact surfaces 40 and 41 which are at a slight angle to the axis of the clutch member 13. A 10° to 20° inclination of the contact surface has proved satisfactory in service. If desired, balk actuating elements may be provided on both sides of the gaps 34 and 35. Correspondingly angled contact surfaces 42 and 43 are formed on the inner opposed corners of the balking elements 26 and 27 adjacent to the wedge-shaped elements 38 and 39 at the inner ends of the balking elements 26 and 27. The balking surfaces 44 and 45 are inclined at a greater angle to the axis of the clutch member 13 and cooperate similarly with inclined surfaces 46 and 47 on opposite sides of the grooves 36 and 37 in the slidable clutch member 13. The inclinations of the balking surfaces 44, 45, 46 and 47 to the axis of the clutch is between about 55° and 65°.

With the synchronizer in the condition shown in Fig. 1, the slidable clutch member 13 is in a central or neutral position between the gears and the friction clutches, including the friction disks 30, 31, are in light frictional relation. Such frictional cooperation is produced by a film of oil which is maintained between the braking disks. This provides a slight torque or drag sufficient to hold the balking elements 26 and 27 against the balk actuating elements 38 and 39 when the shaft 13 and gears 14 and 15 are rotating at different speeds.

In operation, and with the parts in the positions shown in Fig. 2, initiation of a shifting motion of the clutch member 13 in the direction of the arrow will result in relative motion between the balk actuating element 39 and the balking element 27. Inasmuch as the balking element 27 is held in contact with the balk actuator 39 by the frictional drag between the clutch disks 30, 31, the surface 43 of the balking member will slide along the surface 41 of the balk actuator from the dotted line position to the balking position shown in solid lines. During this motion, an axial force is transmitted through the element 27 to the ring 25 to press the braking disks 30 and 31 into tighter frictional contact, thereby increasing the drag or frictional contact. When the balking position is attained the surfaces 45 and 47 are in contact and, being at a greater angle to the direction of the applied force, a larger axial component is transmitted to the braking disks 30 and 31 to increase the frictional contact between them. At this point the balking element 27 cannot slide along the surface 47 into the groove 37 even when a large shifting force is applied, because the balking element 27 is held against the surface 47 and the actuating element 39 with a torque great enough to prevent such sliding. The torque results from the frictional contact between the relatively rotating braking disks 30 and 31, due to the greatly increased pressure thereon.

After synchronization is attained, the torque which maintains the balking element 37 against the surface 47 is reduced, there being no relative motion between the disks 30, 31 and the shifting effort will cause the balking element 27 to slide past the surface 47 into the recess 37, allowing the clutch teeth 19 and 21 to engage smoothly.

Axial motion of the slidable clutch member 13 in the opposite direction will engage the clutch teeth 18 and 20 in a similar manner through the action of the balking element 26 and the balk actuator 38.

From the above description, it will be readily apparent that the present invention provides a new and improved balking means for synchronizers for change speed transmissions whereby crashing is effectively eliminated when high speed power-operated shifting devices are used and without increasing the wear of the components or reducing the operating efficiency of the transmissions.

Although the invention has been described with respect to a specific embodiment as illustrated in the accompanying drawings, variations and modifications will occur to those skilled in the art and these are intended to be included within the scope of the invention as defined in the appended claims.

I claim:

1. In a synchronizing mechanism the combination of a pair of clutch members relatively shiftable into and out of power-transmitting engagement upon the application of a shifting force, a balking member having at least one balking element adapted to cooperate with one of said clutch members tending to prevent such engagement when said clutch members are not synchronized, means responsive to relative motion of said clutch members producing a force to normally maintain said balking member in a position to prevent such engagement, and balk actuator means associated with one of said clutch members operative to increase said maintaining force upon the intiation of relative motion tending to shift said clutch members into engagement.

2. In a synchronizing mechanism the combination of a pair of clutch members relatively shiftable into and out of power-transmitting engagement upon the application of a shifting force, a balking member having at least one balking element movable to an idling position in the absence of a shifting force and to a balking position in response to a shifting force to cooperate with one of the clutch members preventing such engagement when the clutch members are not synchronized, balk actuator means associated with one of the clutch members and adjacent to the balking element in the idling position, means responsive to relative motion of said clutch members for producing a force to normally maintain said balking element in contact with said balk actuator means in said idling position, the balk actuator means being responsive to a shifting force urging the clutch members into engagement to increase said maintaining force when said balking element is moved from said idling position toward said balking position, and synchronizing means operative to further increase said maintaining force until said clutch members are synchronized when the balking element is in the balking position.

3. In a synchronizing mechanism the combination of a first clutch member and a second clutch member relatively shiftable into and out of power-transmitting engagement upon the application of a shifting force, a balking member having at least one balking element adapted to cooperate with the first clutch member to prevent such engagement when said clutch members are not synchronized, synchronizing means comprising at least one friction member associated with said balking member and at least one friction member associated with the second clutch members, said friction members being movable into frictional engagement resisting relative rotation, cam means associated with the first clutch member formed to cooperate with said balking member to transmit to said friction members in sequence a small axial force and a greater axial force when a shifting force is applied to said clutch member, whereby said friction members are first pressed into positive frictional contact and then pressed with greater force to produce synchronization, and drag means associated with said friction members to normally maintain said balking member in contact with said cam means.

4. In a synchronizing mechanism the combination of clutch means comprising a first clutch member and a second clutch member relatively shiftable into and out of power-transmitting engagement upon the application of an axial shifting force, a balking member having at least one balking element adapted to cooperate with said first clutch member to prevent such engagement when said clutch members are not synchronized, said balking element being formed with a guiding surface inclined at a slight angle to said shifting axis and a balking surface inclined at a greater angle to said axis, balk actuator means associated with said first clutch member comprising at least one actuator element formed with a guiding surface at a slight angle to said axis whereby a component of said axial shifting force may be transmitted from said first clutch member to said balking member, balking means associated with said first clutch element having a balking surface formed at a greater angle to said axis to cooperate with the balking surface of said balking element to prevent said engagement until synchronization is attained, synchronizing means comprising at least one friction member associated with said balking member and at least one friction member associated with said second clutch member, said friction members being adapted to be pressed into frictional contact by said axial shifting force transmitted through said balking member, oil drag means associated with said friction members to normally retain said balking element in contact with said actuator element during relative rotation of said friction members so that an axial force is transmitted to said friction members urging them into frictional contact when said actuator element is axially moved with respect to said balking element and a greater axial force is transmitted when the balking means associated with said first clutch element is moved against the balking element.

5. In a synchronizing mechanism comprising a pair of clutch members relatively shiftable into and out of power-transmitting engagement upon the application of an axial shifting force, balking means to prevent such engagement when the clutch members are not synchronized, synchronizing means actuated by an axial force for bringing said clutch members into synchronization and frictional means responsive to relative rotation of said clutch members to normally maintain said balking means in a balking position, the combination of a cylindrical balking member surrounding one of said clutch members mounted to allow axial and limited rotational motion relative thereto, having a surface adapted to actuate said synchronizing means upon application of an axial force and at least one balking element extending inwardly in a radial direction to engage said clutch member, said balking element having an actuating surface inclined at a slight angle to the axis of said balking member and a balking surface inclined at a greater angle thereto and cooperating cam means associated with said clutch member adjacent said balking element having an actuating surface inclined at a slight angle to said axis and a balking surface inclined at a greater angle thereto whereby said maintaining force is increased upon initiation of an axial shifting force by transmission of an axial force through said actuating surfaces and is further increased when the balking member operates to prevent engagement by transmission of a greater axial force through said balking surfaces.

References Cited in the file of this patent
UNITED STATES PATENTS

| | | |
|---|---|---|
| 2,397,943 | Bull | Apr. 9, 1946 |
| 2,627,956 | Perkins | Feb. 10, 1953 |

FOREIGN PATENTS

| | | |
|---|---|---|
| 1,095,514 | France | Dec. 22, 1954 |